April 28, 1953
G. D. WIEPERT
2,636,641
PIVOTAL HANDLE AND HANDLE-BRACE
CONSTRUCTION FOR CONTAINERS
Filed April 29, 1949
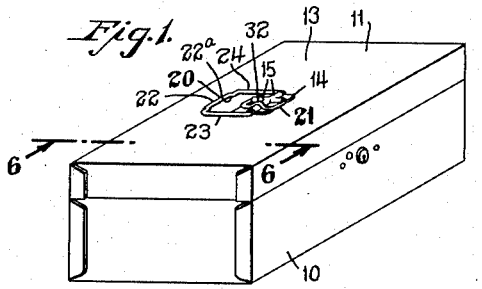
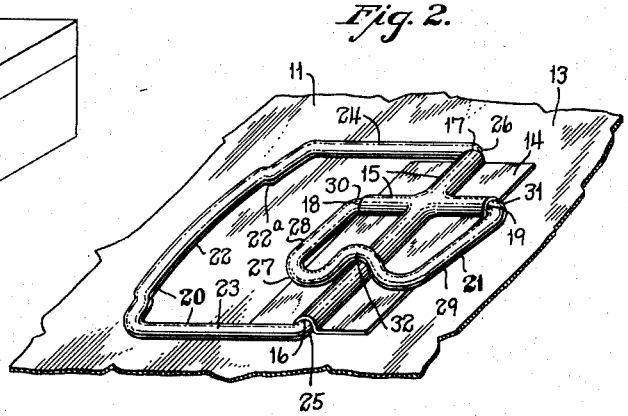
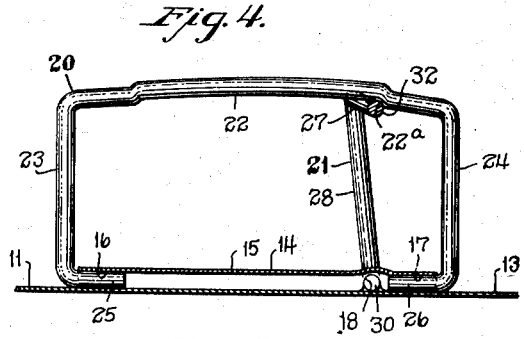
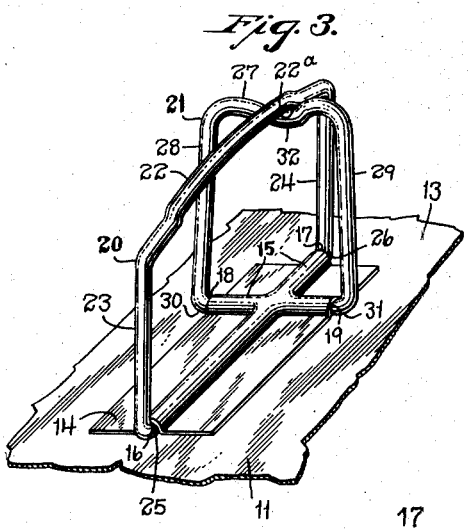
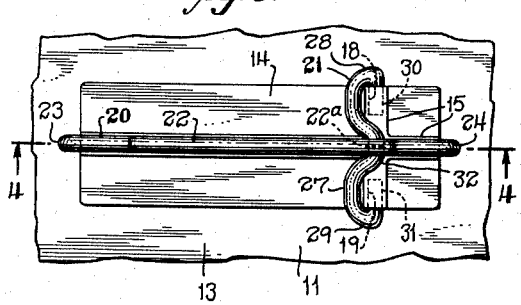
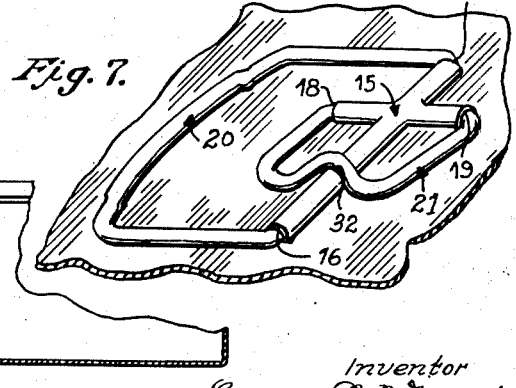
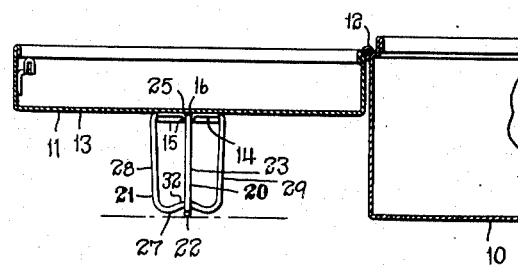
Inventor
George D. Wiepert
By Seymour, Earle & Nichols
Attorneys Patented Apr. 28, 1953

2,636,641

UNITED STATES PATENT OFFICE 2,636,641

PIVOTAL HANDLE AND HANDLE-BRACE CONSTRUCTION FOR CONTAINERS

George D. Wiepert, Branford, Conn., assignor to The Merriam Manufacturing Company, Durham, Conn., a corporation of Connecticut Application April 29, 1949, Serial No. 90,406

2 Claims. (Cl. 220—96)

The present invention relates to improvements in handles for cash boxes, tool boxes and other containers, and relates more particularly to improvements in supporting-means for such handles whereby the same may be releasably held or braced in extended or open position.

One of the main objects of the present invention is to provide a pivotal handle and handle-brace construction for a container having a cover hinged thereto whereby the pivotal handle may be releasably held in its extended or operative position, so that when the cover is swung open to a position where it is capable of holding articles, the handle supports the cover, thereby preventing the container from becoming upset.

A further object of the present invention is to provide a superior construction and arrangement of parts whereby a pivotal handle may be releasably held in an open or extended position and whereby when the handle proper is swung into its retired position, it, together with its supporting-means, will fit closely to the surface of a container and thus not obtrude to an objectionable degree.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a perspective view of a container equipped with the improved pivotal handle and handle-brace construction embodying the present invention;

Fig. 2 is a fragmentary perspective view of the top area of the container of Fig. 1 on a larger scale and showing the pivotal handle and handle-brace in their retired positions;

Fig. 3 is a view similar to Fig. 2 but showing the handle and the handle-brace swung outwardly;

Fig. 4 is a longitudinal sectional view taken on the line 4—4 of Fig. 5 and showing both the handle and handle-latch in their outward position;

Fig. 5 is a top or plan view of the central area of the container-top together with the handle and associated features, which handle together with the handle-brace are in their extended or operative positions;

Fig. 6 is a cross-sectional view taken on the line 6—6 of Fig. 1 but showing the cover swung into an open position and supported by the pivotal handle and handle-brace; and Fig. 7 is a view similar to Fig. 2 and showing a slight modification of the invention.

For the purpose of making clear the utility of the pivotal handle and handle-brace construction of the present invention, there is shown in the accompanying drawings a container of the type adapted to be utilized as a cash box, bond box, a tool box or the like and which comprises a relatively-deep rectangular body 10 and a relatively-shallow rectangular cover 11 pivotally connected to the said body by hinge-means indicated at 12 in Fig. 6.

Spot-welded or otherwise rigidly secured to the upper face of the top wall 13 of the cover 11 is a rectangular mounting-plate generally designated by the reference character 14.

The mounting-plate 14 above referred to is pressed up to provide a cross-shaped embossment generally designated by the reference character 15 having ends of both its main reach and cross-arm respectively intersecting the various edges of the mounting-plate, as is especially well shown in Figs. 2 and 3. As thus formed, the mounting-plate 14 and its embossment 15 provides sockets 16 and 17 respectively at the opposite ends of the said mounting-plate, and sockets 18 and 19 respectively at the respective opposite sides of the said mounting-plate though much closer to the socket 17 than to the socket 16 before referred to.

Pivotally connected to the respective opposite ends of the mounting-plate 14 above referred to is a substantially U-shaped handle proper generally designated by the reference character 20, while pivotally connected to the respective opposite sides of the said mounting-plate is a substantially U-shaped handle-brace generally designated by the reference character 21.

The handle proper 20 above referred to may be conveniently bent up from heavy metal wire and, in the instance shown, comprises an outwardly-arched cross-reach 22, which, when in its operative position extends in substantial parallelism with the upper surface of the cover 11, two integral substantially-parallel side-arms 23 and 24 both extending substantially perpendicularly with respect to the upper surface of the cover 11 and respectively terminating in integral pintles 25 and 26. The said pintles 25 and 26 extend toward each other and respectively extend into the sockets 16 and 17 provided by the terminal ends of the main reach of the embossment 15 of the mounting-plate 14. Adjacent the side-arm 24, the cross-reach 22 is provided with a stop-abutment 22a for the purpose as will hereinafter appear.

The handle-brace 21 above referred to, like the handle proper 20, may be conveniently formed of metal wire having an appreciable degree of springiness and comprises a cross-reach 27 extending crosswise of the mounting-plate 14 in substantial parallelism therewith when the handle-brace is in its operative position, two integral side-arms 28 and 29 respectively terminating in integral pintles 30 and 31.

The pintles 30 and 31 above referred to extend toward each other in parallelism with the upper surface of the cover 11 and respectively extend into the sockets 18 and 19 provided by the terminal ends of the cross-arm of the embossment in the mounting-plate 14. The central portion of the cross-reach 27 is bowed downwardly toward the pintles 30 and 31 to provide a retaining-loop 32 for the reception of the cross-reach 22 of the handle 20 under circumstances as will be hereinafter explained. The retaining-loop 32 just referred to not only is bowed toward the pintles 30 and 31 but is also bowed to one side, as may be seen by reference to Figs. 3, 4 and 5, in particular, so as to accommodate the adjacent portion of the embossment 15 when swung down into its retired position in the manner indicated in Figs. 1 and 2.

Normally, the handle 20 will be swung downwardly into the position in which it is shown in Figs. 1 and 2 against the upper surface of the top wall 13 of the cover 11 and will be yieldingly held in such position by the frictional engagement of its pintles 25 and 26 in the sockets 16 and 17 and against the upper surface of the top wall 13. Similarly, the handle-brace 21 will normally be swung down into its retired position, as indicated in Figs. 1 and 2, in which position it will be held by the frictional engagement of its pintles 30 and 31 with the sockets 18 and 19 and the adjacent upper surface of the top wall 13. In the position just described, the retaining-loop 32 will accommodate the adjacent portion of the embossment 15, as is especially well shown in Fig. 2.

It is preferred to employ a separate mounting-plate such as 14, but it is to be noted that, if desired, the embossment 15 or its equivalent may be formed directly in the cover 11, as shown in Fig. 7, in which case, for the purposes of the present disclosure and the appended claims, the portion of the cover to which the handle is attached is considered to be the mounting plate.

When it is desired to carry the container, the handle 20 may be swung upwardly and the fingers of the user extended beneath the cross-reach 22, in the normal manner of container-handles. Should, however, it be desired to swing the cover 10 into its fully open position, to thereby fully expose the contents of the body 10 of the container and should it further be desired to support the said cover 11 in its said fully open position side by side with the body 10 as is indicated in Fig. 6, the handle 20 may first be swung upwardly substantially perpendicular to the cover, following which the handle-brace 21 may also be swung upwardly so that the bowed portion of the cross-reach 22 of the said handle is accommodated in the retaining-loop 32 with a jam-fit and the said loop 32 engages the stop-abutment 22a of the cross-reach 22, preventing further swinging movement of the handle-brace 21 in a direction toward the side-arm 24 of the handle 20. In order to prevent the handle-brace from dropping back to its retired position, it is desirable that the retaining loop 32 be located on a line substantially perpendicular to the intersection in the cross-shaped embossment 15 as shown in Figs. 4 and 5. Under these conditions, the handle 20 will be held against swinging into its retired position by the handle-brace 21 and, conversely, the handle-brace itself will be held by the said handle against accidental movement into its retired position.

The handle 20 and handle-brace 21 as thus erected will provide a rigid mutually-supporting structure extending away from the face of the cover 11 so as to rest upon the same table or other surface as that upon which the body 10 may be placed, to thus support the said cover in substantially the position in which it is shown in Fig. 6. In the position just referred to, the inverted cover 11 forms a convenient receptacle (while supported by the members 20 and 21) for receiving part of the contents of the body 10 of the container during the sorting of the latter or a search therethrough.

By means of the present invention, the utility of a covered container is greatly increased by adequately supporting the cover thereof in substantially the position shown in Fig. 6.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A handle of the class described comprising in combination a mounting plate having a cross-shaped embossment shaped to provide two pairs of outwardly opening sockets, a substantially U-shaped handle member including a cross-reach and a pair of side-arms extending therefrom, said handle member being pivoted to one pair of said sockets in said mounting plate and swingable relative thereto into and out of operative position substantially perpendicular to said mounting plate, a substantially U-shaped handle-brace also including a cross-reach and a pair of side-arms extending therefrom, said handle-brace being pivoted to the other pair of said sockets in said mounting plate and swingable relative thereto into and out of operative bracing position with said handle member, the cross-reach of said handle brace being provided with a retaining loop shaped to engage and retain the cross-reach of said handle member when both the latter and the handle-brace are in their respective operative positions, said retaining loop being further shaped to fit over the embossment of said mounting plate when said handle-brace is swung out of its operative position.

2. The combination defined in claim 1 which further includes a stop-abutment on the cross-reach of said handle member for engagement by the retaining loop of said handle-brace when the latter is swung into its operative position with the handle member, the portion of said retaining loop engaging said stop-abutment being on a line substantially perpendicular to the mounting plate at the intersection in said cross-shaped embossment, and wherein said mounting plate comprises an integral portion of the article on which said handle is mounted.

GEORGE D. WIEPERT.

References Cited in the file of this patent

UNITED STATES PATENTS

| Number | Name | Date |
| --- | --- | --- |
| 420,491 | Bryant | Feb. 4, 1890 |
| 967,211 | Long | Aug. 16, 1910 |
| 1,119,619 | Lusk | Dec. 1, 1914 |
| 1,411,093 | Harrington | Mar. 28, 1922 |
| 1,893,526 | Shriver | Jan. 10, 1933 |
| 1,976,765 | Berry | Oct. 16, 1934 |
| 2,017,485 | Yawman | Oct. 15, 1935 |